Patented Apr. 7, 1942

2,279,284

UNITED STATES PATENT OFFICE 2,279,284

SILVER ALLOY

Rene Wassermann, New York, N. Y.

No Drawing. Application March 22, 1941,
Serial No. 384,726

3 Claims. (Cl. 75—178)

This application is a continuation-in-part of my copending application Serial No. 365,483 filed November 13, 1940, and further contains improvements over the subject matter disclosed in said copending application.

The present invention relates to alloys or similar compound material. Its main object is to provide an efficient, economical and extremely effective alloy for brazing, welding, soldering or similar purposes.

The alloy prepared and produced in accordance with the present invention is unusually adaptable for bonding or uniting steel, sheet metal; profiles, tubes etc. made of copper, cast iron, brass or bronze.

It is another object of the present invention to provide an alloy which contains selected proportionate constituents which alloy has unusual strength and hardness, but which is highly fluidous during the brazing or like operation and has a perfect affinity to ferrous materials and steel.

A further object of the present invention is to provide an alloy particularly suitable for oxy-acetylenic welding, the properties of said alloy being not affected by high temperatures of the welding torch.

Yet, another object of the present invention is to provide an alloy of the above nature which has high mechanical and physical properties and at the same time possesses the characteristics of deep penetration within the base material.

Other objects of the invention will appear as the description proceeds, it being understood, however, that it is not intended that the invention be limited to the exact details described herein which illustrates the production of the knowledge gained through or gleaned from an understanding of the invention; and it is further intended that there be included, as part of the invention all such obvious changes and modifications thereof as would occur to a person skilled in the art to which this invention pertains and as would fall within the scope of the claims.

According to the present invention copper and silver are employed in suitable proportions together with other constituents, such as nickel and zinc to which deoxidizer may be added in small amounts to improve brazing properties. Such deoxidizer may be manganese, phosphorus or silicon.

The following are the ranges of materials within which the alloy may be produced according to the invention.

Silver_____From .1% to 49% by weight.
Copper_____From 10% to 60% by weight.
Nickel_____From .5% to 16% by weight.
Zinc_____Remainder.

The amount of the deoxidizing agent to be selected may be from .1% to 1%. To this alloy may be added tin or cadmium in amounts from .1% to 15%, as the case may be.

The following example is given falling under the above range and giving the desired result:

Silver_____Less than .7% by weight.
Copper_____Less than 50% by weight.
Nickel_____From 9% to 12% by weight.
Silicon_____.1% to 1% by weight.
Zinc_____Remainder.

The composition may be molded in the form of rods which may be employable for brazing purposes preferably on steel or other ferreous metals and will be found to possess besides high tension strength and other valuable characteristics, higher mechanical and physical properties than heretofore known.

In accordance with the above it will be understood that wide deviations may be made from the embodiments of the invention herein described without departing from the spirit of the invention.

The novel alloy can be used with great facility in obtaining strong bonds between parts particularly made of ferreous materials and, when applied in various operations will give a molecular union of very homogeneous character.

Having thus described the invention what is claimed as new and desired to be secured by Letters Patent, is:

1. An alloy consisting of silver from .2% to 12% by weight, copper from 10% to 50% by weight, nickel varying from 9% to 12% by weight, silicon varying from .1% to 1% by weight, the balance being zinc.

2. An alloy consisting of silver, copper, nickel, zinc and silicon in approximately the following proportions: silver from .3% to 7%, copper from 15% to 50%, nickel from 9% to 12%, silicon from .1% to 1%, the balance being zinc.

3. An alloy consisting of approximately 2% silver, 43% copper, 11% nickel, .3% silicon, the balance being zinc.

RENE WASSERMANN.